Patented Feb. 26, 1952

2,587,457

UNITED STATES PATENT OFFICE 2,587,457

PRODUCTION OF VITAMIN A AND RELATED COMPOUNDS

Myer Freed, Chicago, Ill., assignor to Dawe's Products Company, Chicago, Ill., a corporation of Colorado No Drawing. Application August 9, 1950, Serial No. 178,545

6 Claims. (Cl. 260—617)

This invention relates to a new and improved process for the manufacture of vitamin A and related compounds.

The invention further relates to novel intermediate compounds and to methods of producing same, which are useful in and facilitate the manufacture of said vitamin A and related compounds.

Known methods whereby vitamin A is being commercially synthesized today require the preliminary formation of a condensation product of methyl vinyl ketone and acetylene, a derivative of which is then condensed with an aldehyde derived from beta ionone by the addition of one carbon atom through a Darzen synthesis. The adduct so obtained has the carbon atoms arranged as in vitamin A, and is converted into the vitamin by partial hydrogenation of the triple bond to a double bond, the loss of the elements of a molecule of water and isomerization or shifting of the double bonds to the position characteristic of vitamin A. A 25% yield based on beta ionone is claimed. (U. S. 2,451,735—6–7–8–9–40–41.)

A simplified expression of the manner in which the carbon skeleton of vitamin A is built up from beta ionone may be written as follows:

$$C_{13} \rightarrow C_{14} \rightarrow C_{20}$$

Since beta ionone is the most expensive reactant used and is also extremely sensitive and subject to side reactions with accompanying losses which increase geometrically with every step of the reaction, it would be obviously desirable to build up the carbon skeleton of vitamin A in a single step, by the direct addition of a 7 carbon compound of the requisite structure to beta ionone, as follows:

$$C_{13} \rightarrow C_{20}$$

Isler and Businger (U. S. 2,475,139) have described the compound 3-hydroxy-3-methyl-hexene-(1)-yne-(5), which through the di-Grignard compound is linked directly to beta ionone. They made the hydroxymethylhexeneyne by the method of Zeile and Meyer (Ber. 75, 356 (1942)) from propargyl bromide and an excess of methyl vinyl ketone; they give no figures on yields, beyond stating that the product "may be distilled from the viscous residuue in good yield." The method is sensitive to traces of impurities, and uses two reagents which are difficult to obtain commercially, propargyl bromide and methyl vinyl ketone; the latter is also very unstable when pure, requiring to be kept in the absence of air and at below —10° C. Apparently Isler and his co-workers prefer the method using the $C_{14}$ aldehyde and the condensation product of methyl vinyl ketone and acetylene, since that process is reported to be in actual use.

Another approach is that of Brit. Pat. 630,865, as reported in Chem. Abs. 44, 4036$^b$ (1950). In this method 4-chloro-3-methyl-butene-(2)-yl-(1)-ether prepared from isoprene, is condensed with alpha ethynyl beta ionol, prepared from beta ionone and acetylene. Summarizing as before:

$$C_{13} \rightarrow C_{15} \rightarrow C_{20}$$

In the method of the present invention, I employ another isoprene derivative, namely a 1-halo-2-methyl-butadiene, such as for example 1-bromo-2-methyl-butadiene, which may be made from the 1,4 dibrom addition product of isoprene (1,4 dibrom-2-methyl-butene-(2)), by the use of such dehydrobrominating agents as potassium hydroxide to remove the elements of one molecule of hydrogen bromide. Petrov, J. Gen. Chem. U. S. S. R. 13, 481–90 (1943). The remaining bromine atom is relatively resistant to the action of dehydrobrominating agents, even solid potassium hydroxide at the temperatures of 80 to 100° C.

The corresponding chloro compound may also be used, though the bromo compound is somewhat more convenient.

The resulting 1-halo-2-methyl-butadiene, which may be considered to be the starting material of the processes of the present invention, is reacted with acetylene to form the novel composition 4-methyl-hexa-3,5-diene-1-yne. This is accomplished in the presence of a strong alkali catalyst in a suitable solvent, either by adding an alkali to said butadiene and acetylene reactants, or by reacting said butadiene with a preformed alkali metal acetylide.

In accordance with the preferred practice of the present invention, I react the 1-halo-2-methyl-butadiene with acetylene, at a temperature below —10° C. and preferably below —30° C. in the presence of an alkali catalyst in a relatively inert or indifferent solvent. I preferably employ finely ground potassium hydroxide. Other alkali hydroxides such as sodium or lithium hydroxides may be used but give poorer yields. Alkali alcoholates are also effective. The solvent may be an indifferent solvent such as diethyl ether or benzene, although solvents forming loose complexes with potassium hydroxide may be used, such as acetals, ketals, and glycol ethers, including however, also those of low as well as high boiling point, provided only that the boiling point of the solvent is sufficiently different from that of the product to permit separation by distillation. It is thus unnnecessary to use such special solvents as anhydrous ammonia, when employing alkali metal acetylides, which is not only expensive and toxic but requires special equipment to handle it, due to its low boiling point and strongly irritating vapors.

The reaction with acetylene can also be carried out in anhydrous ammonia by prior formation of sodium (or other alkali metal) acetylides, as is done in prior art methods of condensing methyl vinyl ketone with acetylene, or in condensing beta ionone with acetylene. However, in reactions in anhydrous ammonia all reactants, solvents and other reagents must be dry. Presence of moisture is not critical in the alkali metal hydroxide method.

It is to be emphasized that previous methods have preferred the use of anhydrous ammonia solution for the condensation of unsaturated ketones such as methyl vinyl ketone and beta ionone with acetylene (via alkali metal acetylides) because of the sensitivity of these compounds to the reagents used in other solvents. Because of the insensitivity of the 1-halo-butadienes much stronger, cheaper, more available, more potent catalysts or condensing agents, and cheaper and more readily handled solvents may be used.

The following is an example of the method of producing 4-methyl-hexa-3,5-diene-1-yne by reacting a 1-halo-2-methyl-butadiene with acetylene and the direct addition of an alkali catalyst:

Example 1

90 g. commercial KOH pellets containing about 15% water were ground in a Waring Blendor and the fine powder transferred to a 1 liter Kjeldahl flask with 200 cc. ether. This was fitted with a three-holed stopper to admit an inlet tube for acetylene, a sealed stirrer, and an exit tube connected to a mercury bubbler to relieve any excess pressure. The stopper was wired down, the stirrer started, and, dry solvent free acetylene passed into the flask (cooled at −30° C.) at such a rate that only an occasional bubble escaped through the bubbler. Acetylene was passed at the rate of 500 ml. per minute at the start, and gradually reduced so that only an occasional bubble escaped through the bubbler. Thirty minutes later, a solution of 66 g. 1-brom-isoprene dissolved in 50 cc. ether was added over 10 mins. the flow of acetylene being reduced to 100 ml. per minute. Let stir two more hours. Add 200 ml. of cold water while keeping the flask in the cooling bath. Separate, wash with water to neutrality, dry with anhydrous sodium sulfate and distill off the solvent. The product distilled at 65–66° C. at 123 mm. pressure. The yield was 98% of the theoretical, based on the bromide used. The product was a pale, lemon yellow liquid, with an absorption maximum at 237 mu;

$$E^{1\%}_{1\text{ cm.}} = 620 \text{ in methanol}$$

The following is an example of the method of producing 4-methyl-hexa-3,5-diene-1-yne by reaction of a 1-halo-2-methyl-butadiene with an alkali metal acetylide:

Example 2

1 mole 1-bromo-isoprene is slowly stirred into a solution of sodium acetylide prepared from 1.5 moles (34.5 g.) sodium in 1.5 liters anhydrous ammonia containing 0.3 ferric nitrate and excess acetylene, cooled to −35° C. in a Dry Ice and alcohol bath. After all the bromide was added, continue stirring for ½ hour more. The excess sodium acetylide is decomposed with 35 g. solid ammonium chloride, the ammonia evaporated off, the solid residue extracted with ether, filtered, the ether evaporated off, and the hydrocarbon residue purified by distillation. The yield is 95% of faintly yellow liquid boiling at 65–66° C. at 123 mm.;

$$E^{1\%}_{1\text{ cm.}} = 620$$

The product obtained from the reaction of 1-halo-2-methyl-butadiene with acetylene by any of the above briefly indicated methods yields the new composition 4-methyl-hexa-3,5-diene-1-yne. This boils at 65–66° C. at 123 mm. pressure and has an absorption maximum at 237 millimicrons;

$$E^{1\%}_{1\text{ cm.}} = 620$$

at the maximum. It is a clear, mobile, pale yellow liquid with a somewhat greenish shade.

The structure of the compound is:

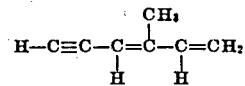

By whichever method one obtains the above acetylenic hydrocarbon, it is converted to the corresponding acetylenic Grignard composition by reacting it with a Grignard reagent such as ethyl magnesium bromide to form

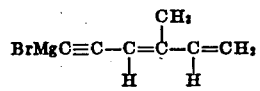

the Grignard of 4-methyl-hexa-3,5-diene-1-yne. This acetylenic Grignard is then condensed with beta ionone

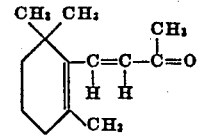

to form the following condensation product

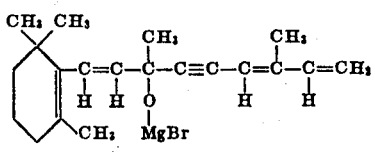

It is to be noted that the above acetylenic Grignard is quite soluble in ether in contrast to similar compounds which have heretofore been proposed. The precautions usual in Grignard reactions have of course to be observed here also— the use of anhydrous reagents, the exclusion of air and water from the apparatus.

After decomposing the Grignard of the condensation product so formed by suitable means, such as for example, by means of dilute acids, or by more concentrated solutions of salts formed from a strong acid and a weak, volatile base such as ammonium chloride, etc., the desired condensation product, having the carbon skeleton of vitamin A is obtained. This new compound is a thick orange-colored oil, maximum of absorption at 284–286 mu;

$$E^{1\%}_{1\text{ cm.}} = 254$$

It is systematically named 3-hydroxy-3,7-dimethyl-1-(2'6'6' trimethyl - cyclohexene - (1') - yl)-nona-1,6,8-triene-4-yne, and has the following structure:

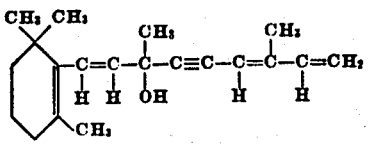

The foregoing compound requires only the addition of two atoms of hydrogen to the triple bond to yield an isomer of vitamin A. This partial hydrogenation is advantageously carried out by means of palladium catalysts on a suitable support such as carbon or barium sulfate; partial poisoning of the catalyst e. g. by means of 20% quinoline adsorbed on it prior to use slows up its action and makes regulation easier. Hydrogen gas at atmospheric or slightly greater pressure is used.

The isomer so formed is 3-hydroxy-3,7-dimethyl - 1 - (2'6'6'-trimethyl-cyclohexene-(1')-yl)-nona-1,4,6,8-tetraene having the structure

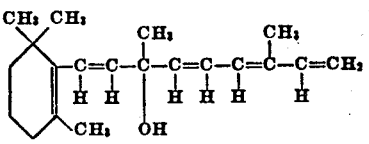

The foregoing isomer is then isomerized to vitamin A

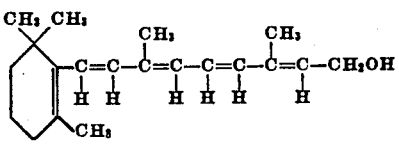

by acids, iodine or iodine compounds in catalytic amounts, as are intermediates which have been previously described; however, dehydrating conditions are unnecessary and undesirable, therefore I prefer the use of aqueous acids, such as 50% formic acid at refluxing temperature, or aqueous or alcoholic alkali.

The following is an illustrative example of my method for producing vitamin A starting with the novel composition 4-methyl-hexa-3,5-diene-1-yne:

Example 3

To a solution of a Grignard reagent made from 6.1 g. magnesium and 27.2 g. ethyl bromide in 50 ml. anhydrous ether contained in a 3-necked flask fitted with a sealed stirrer, reflux condenser and dropping funnel, is added dropwise a solution of 24.0 g., 4-methyl-hexa-3,5-diene-1-yne in 50 ml. anhydrous ether, while refluxing gently and stirring. After all the hydrocarbon has been added the refluxing and stirring is continued for a further hour. The reaction mixture is then cooled with ice; a solution of 40 g. beta ionone in 80 ml. anhydrous ether is then slowly added (over 1 hour); the solution turns from black to green. Stirring is continued overnight at room temperature. The contents of the flask have now turned to a bright yellow with a greenish cast. The mixture is then heated to reflux for a further two hours. It is cooled with ice, and a cold solution of 15 g. ammonium chloride in 90 ml. water is added slowly with continued cooling and stirring. The pale lemon yellow upper layer is separated, washed with water and dried with sodium sulfate.

The solvent and then the unreacted reagents were distilled off, ultimately at a vapor temperature of 118° at 6 mm. pressure. The residue was a viscous red oil, becoming a clear resinous solid at refrigerator temperature. It has an absorption maximum at 284-286 mu, a minimum at 240-250 mu, with indications of another maximum below 220 mu. The yield was 54.6 g. approximately a 90% yield based on the beta ionone used.

The oil was taken up in 100 ml. ethyl acetate and hydrogenated at atmospheric pressure with 0.3 g. 5% palladium on carbon catalyst. When 470 ml. had been absorbed the catalyst was filtered off.

The solvent is evaporated, and the residue refluxed for one hour with 10 times its volume 50% formic acid. The mixture is extracted with petroleum ether and washed with water.

On removal of the solvent an orange colored viscous oil is obtained which gives a blue color with antimony trichloride and which contains 60% vitamin A by analysis. It is biologically active on rats. Further purification is possible by solvent partition, chromatography, etc., as is commonly practiced.

The following is an illustrative example of a method for producing vitamin A from the hereinbefore described novel isomer thereof:

Example 4

2.0 g. of 3-hydroxy-3,7-dimethyl-1-(2'6'6' trimethyl - cyclohexene(1')-yl)-nona-1,4,6,8-tetraene is refluxed with 100 ml. 15% potassium hydroxide solution in alcohol containing 15% water for ½ hour. The mixture is cooled and extracted with petroleum ether. The extract when dried gives a 50% yield of vitamin A.

In the alternative, the foregoing novel isomer of vitamin A may be simultaneously subjected to isomerization and acylation or etherification to produce compounds of the following type:

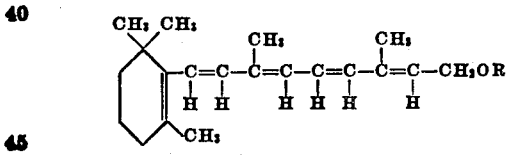

where R=alkyl, aryl or acyl.

Thus, strong mineral acids in alcohol solution lead to the formation of ethers of vitamin A with the alcohol, as in the following example:

Example 5

Into 2.0 g. of 3-hydroxy-3,7-dimethyl-1-(2'6'6' trimethyl - cyclohexene(1')-yl)-nona-1,4,6,8-tetraene dissolved in 50 ml. methyl alcohol is added with stirring 50 ml. concentrated hydrochloric acid at room temperature. Stirring is continued for two hours while the temperature is not allowed to rise above 25° C. The product after diluting with water, extracting with isopropyl ether, washing the extract to neutrality, and evaporating off the solvent, consists of vitamin A methyl ether and isomeric admixtures.

Esterification with organic acid is also catalyzed by mineral acids with simultaneous isomerization to esters of vitamin A, as in the following example:

Example 6

Into 2.0 g. of 3-hydroxy-3,7-dimethyl-1-(2'6'6' trimethyl - cyclohexene(1')-yl)-nona-1,4,6,8-tetraene and 2.0 g. palmitic acid dissolved in 50 ml. methyl alcohol is stirred 50 ml. concentrated hydrochloric acid during ½ hour at room temperature; stirring is continued for another hour. The mixture is diluted with 100 ml. water and 50 ml. petroleum ether, separated, washed with water, 1% sodium hydroxide, and again with water, dried with sodium sulfate, and the solvent evaporated off. The product consists of a mixture of isomeric palmitates including vitamin A palmitate.

I claim as my invention:

1. The process which comprises reacting an isoprene derivative of the group consisting of 1-bromo-2-methyl-butadiene and 1-chloro-2-methyl-butadiene with acetylene in the presence of an alkali catalyst in a relatively inert solvent and at a temperature below −10° C. to form 4-methyl-hexa-3,5-diene-1-yne.

2. The process of claim 1 where the acetylene and the alkali catalyst are added in the form of an alkali metal acetylide.

3. The process which comprises reacting an isoprene derivative of the group consisting of 1-bromo-2-methyl-butadiene and 1-chloro-2-methyl-butadiene with acetylene in the presence of an alkali metal hydroxide in a relatively inert solvent and at a temperature below −10° C. to form 4-methyl-hexa-3,5-diene-1-yne.

4. The process of claim 3 where the alkali metal hydroxide is potassium hydroxide.

5. The process of claim 3 where the isoprene derivative is 1-bromo-2-methyl-butadiene.

6. The method of producing vitamin A alcohol, which comprises reacting 1-bromo-2-methyl-butadiene with acetylene in the presence of potassium hydroxide at a temperature below −10° C. in a relatively inert solvent and recovering 4-methyl-hexa-3,5-diene-1-yne as a reaction product, reacting the latter with ethyl magnesium bromide to form its corresponding acetylenic Grignard, condensing the latter with beta ionone to form a composition having the carbon skeleton of vitamin A, hydrolyzing said condensation product to decompose it to 3-hydroxy-3,7-dimethyl-1-(2'6'6' trimethyl cyclohexene(1')-yl)-nona-1,6,8-triene-4-yne, partially hydrogenating said decomposition product in the presence of a supported palladium catalyst to add two atoms of hydrogen to the triple bond thereof to convert it to 3-hydroxy-3,7-dimethyl-1-(2'6'6' trimethyl cyclohexene(1')-yl)-nona-1,4,6,8-tetraene, and subjecting the latter to isomerization in the presence of an isomerizing catalyst to convert it to vitamin A alcohol.

MYER FREED.

REFERENCES CITED

The following references are of record in the file of this patent:

UNITED STATES PATENTS

| Number | Name | Date |
|---|---|---|
| 2,173,272 | Carter | Sept. 19, 1939 |
| 2,369,156 | Milas | Feb. 13, 1945 |
| 2,369,165 | Milas | Feb. 13, 1945 |
| 2,529,498 | Isler | Nov. 14, 1950 |

OTHER REFERENCES

Thompson et al.: Journal American Chemical Society, vol. 63 (March 1941), pages 752–755.

Isler et al.: Barell Festschrifft, June 1946, page 35.

Heilbron: Jour. Chem. Soc. (1948), pages 386–393.